United States Patent
Ishida

(10) Patent No.: US 7,734,782 B2
(45) Date of Patent: Jun. 8, 2010

(54) METHOD AND SYSTEM FOR CONTROLLING COMPUTER IN SYSTEM

(75) Inventor: Takaichi Ishida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 703 days.

(21) Appl. No.: 11/368,056

(22) Filed: Mar. 2, 2006

(65) Prior Publication Data

US 2006/0294239 A1 Dec. 28, 2006

(30) Foreign Application Priority Data

Jun. 24, 2005 (JP) ............................. 2005-185257

(51) Int. Cl.
*G06F 15/173* (2006.01)
*G06F 9/46* (2006.01)
(52) U.S. Cl. ...................... 709/226; 718/104
(58) Field of Classification Search ............... 709/226, 709/229; 712/229; 711/171, 172; 714/4, 714/10, 11, 12, 13; 718/104; 719/312, 316; 725/98, 103
See application file for complete search history.

(56) References Cited

U.S. PATENT DOCUMENTS

| | | | | |
|---|---|---|---|---|
| 5,594,491 A * | 1/1997 | Hodge et al. | ................. | 725/103 |
| 6,327,591 B1 * | 12/2001 | Osborn et al. | .................. | 707/10 |
| 6,618,820 B1 * | 9/2003 | Krum | ........................... | 714/13 |
| 6,629,266 B1 | 9/2003 | Harper et al. | | |
| 6,772,333 B1 * | 8/2004 | Brendel | ....................... | 713/153 |
| 6,983,463 B1 * | 1/2006 | Hunt | ............................ | 719/316 |
| 7,028,298 B1 * | 4/2006 | Foote | .......................... | 718/104 |
| 7,139,792 B1 * | 11/2006 | Mishra et al. | ............... | 709/203 |
| 7,174,379 B2 * | 2/2007 | Agarwal et al. | ............. | 709/226 |
| 7,356,602 B2 * | 4/2008 | Goldszmidt et al. | ......... | 709/229 |
| 2003/0014526 A1 * | 1/2003 | Pullara et al. | ............... | 709/227 |
| 2003/0172164 A1 * | 9/2003 | Coughlin | .................... | 709/227 |
| 2004/0024880 A1 * | 2/2004 | Elving et al. | ................. | 709/227 |
| 2004/0078782 A1 * | 4/2004 | Clement et al. | ............. | 717/116 |

FOREIGN PATENT DOCUMENTS

JP 2001-188684 7/2001

* cited by examiner

*Primary Examiner*—Wing F Chan
*Assistant Examiner*—Jonathan Willis
(74) *Attorney, Agent, or Firm*—Townsend and Townsend and Crew LLP

(57) ABSTRACT

A server computer is communicably connected to a client computer and has a first and a second execution environment for executing a program for performing information processing in accordance with a processing request transmitted from the client computer. The server computer stores a condition for judging whether a predetermined processing efficiency can be assured for the information processing performed by the first execution environment according to the processing request. The server computer receives the processing request transmitted from the client computer. The server computer judges whether the predetermined processing efficiency can be assured according to the condition. The server computer allocates the processing request to the second execution environment if it is judged that the predetermined efficiency cannot be assured.

7 Claims, 15 Drawing Sheets

METHOD AND SYSTEM FOR CONTROLLING COMPUTER IN SYSTEM

INCORPORATION BY REFERENCE

The present application claims priority from Japanese application JP2005-185257 filed on Jun. 24, 2005, the content of which is hereby incorporated by reference into this application.

BACKGROUND OF THE INVENTION

The present invention relates to a computer control method, a computer, an information processing system, and a program.

There is a case when a computer processing efficiency is lowered as the operation time elapses. It is known that this phenomenon is caused by a programming error such as missing of description for releasing the storage area allocated in a program to be executed in the computer. This is caused software aging. To cope with this software aging, for example, U.S. Pat. No. 6,629,266 (corresponding JP-A-2001-188684) discloses a technique for recovering the original processing efficiency by resetting the application and the system at a predetermined time interval.

SUMMARY OF THE INVENTION

However, there is a problem that when an application or system is reset, it becomes impossible to provide a service by the system until they are restarted.

It is therefore an object of the present invention to provide an information processing method in a server computer, a server computer, an information processing system, and a program capable of suppressing lowering of processing efficiency of a computer without causing such a problem.

In order to achieve the aforementioned object, the main aspect of the present invention provides a server computer control method for controlling a server computer communicably connected to a client computer and having a first and a second execution environment for executing a program for performing information processing in accordance with a processing request transmitted from the client computer, wherein the server computer stores a condition for judging whether a predetermined processing efficiency can be assured for the information processing performed by the first execution environment according to the processing request, receives the processing request transmitted from the client computer, judges whether the predetermined processing efficiency can be assured according to the condition, and allocates the processing request to the second execution environment if it is judged that the predetermined efficiency cannot be assured.

According to the present invention, it is possible to reduce the lowering the computer processing efficiency.

Other objects, features and advantages of the invention will become apparent from the following description of the embodiments of the invention taken in conjunction with the accompanying drawings.

DESCRIPTION OF THE EMBODIMENTS

Figure 1:
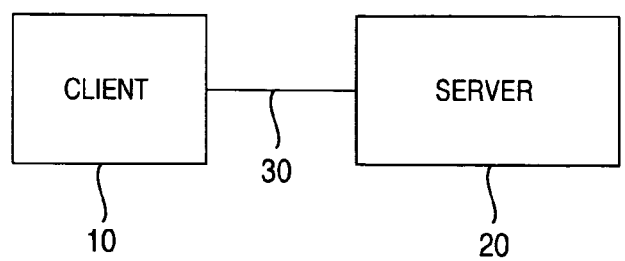
FIG. 1 is a block diagram showing configuration of an information processing system.

FIG. 1 is a block diagram showing configuration of an information processing system according to an embodiment. As shown in this figure, the information processing system according to the present embodiment includes a client computer (also referred to as a terminal and hereinafter, referred to simply as a client) 10 and a server computer (also referred to as a computer, an information processing device, a blade, and hereinafter, referred to simply as a server) 20. The client 10 is connected to the server 20 via a communication network 30 in such a way that communication can be performed. The communication network 30 may be, for example, the Internet, LAN (Local Area Network), a radio network, a telephone line network, or the like.

In the information processing system according to the present embodiment, the server 20 performs information processing according to a request transmitted from the client 10.

The server 20 has a server program functioning as an application server (AP server).

The application server is a type of middle-ware and is positioned at an intermediate position between a front-end client layer such as Web browser and a back-end enterprise information system such as DBMS (DataBase Management System) and ERP (Enterprise Resource Planning) package. The application server provides an execution environment of a business application program (AP) and a business logic program (BL). With the spread of the Internet and the broadband and improvement of the technique for realizing high availability and high reliability, the application server is used not only in the business system in an enterprise, but also for online shopping, online trade, electronic trading between enterprises, and a mission critical business.

For example, however, in the application server on which J2EE (Java2 Platform, Enterprise Edition; registered trademark) is mounted, when Full GC (Garbage Collection) for releasing unused memory area occurs, the processing efficiency in the application server is extremely lowered and it may become difficult to maintain the service quality target. Especially when a large-size virtual memory area is allocated to an application server in the multi-processor system, the processing efficiency in the entire application server is significantly lowered by execution of garbage collection.

Moreover, in an application program executed in an execution environment (also called as a user program, a business program), for example, when an exclusive control between threads or lock of a resource is not released or when an opened file is not closed, the resources allocated to the application program continuously increases, which lowers the processing efficiency of the application server.

In the server 20 according to the present embodiment, two program execution environments are provided. When the processing efficiency of one of the execution environments is to be lowered, allocation of a request from the client 10 is switched to the other execution environment, thereby continuing the information processing service while performing recovery to assure a processing efficiency in the execution environment where the processing efficiency is lowered. Thus, the server 20 does not affect the entire information processing system and it is possible to prevent lowering of the service quality (such as a response time and a throughput) provided by executing a program by the execution environment. The server according to the present embodiment will be detailed below.

===Hardware Configuration===

Figure 2:
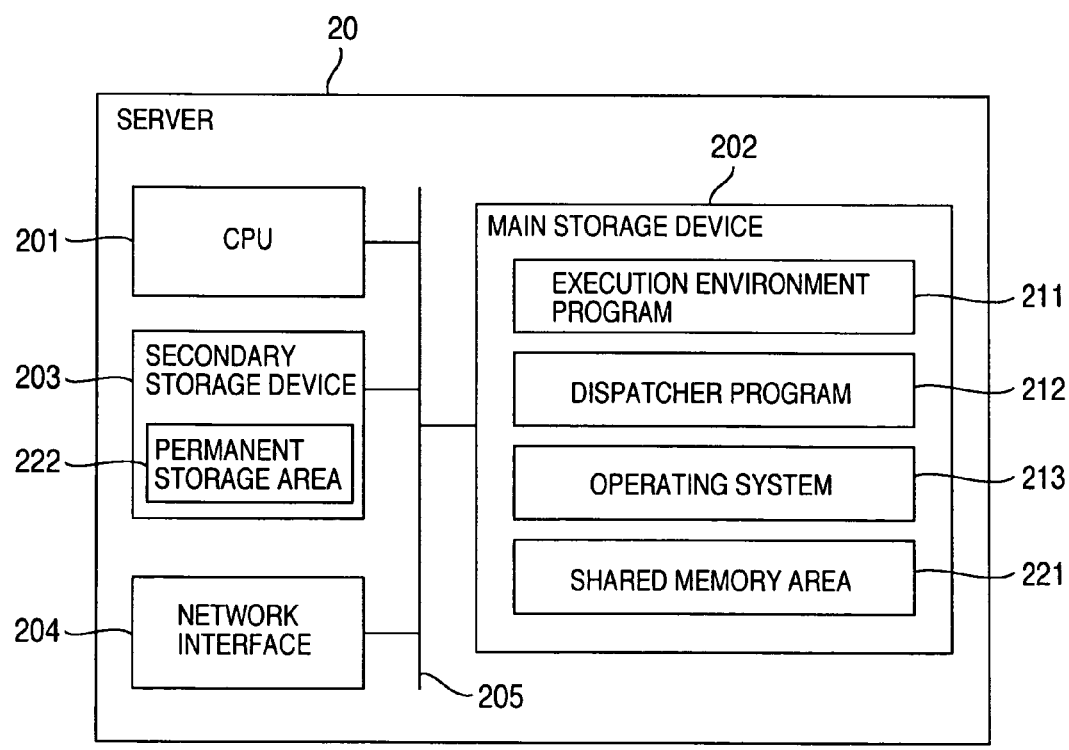
FIG. 2 shows hardware configuration of a server 20.

FIG. 2 is a block diagram showing hardware configuration of the server 20. As shown in this figure, the server 20 according to the present embodiment includes a CPU (Central Processor Unit) 201, a main storage device 202, a secondary storage device 203, and a network interface 204 which are connected to one another by a bus 205.

The secondary storage device 203 stores data and a program. For example, the secondary storage device 203 is a hard disc drive. When a program is stored in the secondary storage device 203, the CPU 201 reads out the program from the secondary storage device 203 and stores the program into the main storage device 202. The CPU 201 executes the program stored in the main storage device 202 so as to realize various functions of the server 20. The network interface 204 is an interface for connection to the communication network 30 such as an adapter for connection to the Ethernet (registered trademark) and a modem for connection to a telephone line network.

The main storage device 202 stores various programs such as an execution environment program 211, a dispatcher program 212, and an operating system 213. The execution environment program 211 is a program for realizing a program execution environment (hereinafter, referred to as AP/BL execution environment 400) for program such as an application program and a business logic. The dispatcher program 212 is a program for realizing a dispatcher 300 which will be detailed later for distributing requests from the client 10 to the execution environments. Moreover, the main storage device 202 has a shared memory area 221 which can be accessed from the two AP/BL execution environments 400. The secondary storage device 203 has a permanent storage area 222 for storing data concerning processing in the AP/BL execution environments 400.

===Software Configuration===

Figure 3:
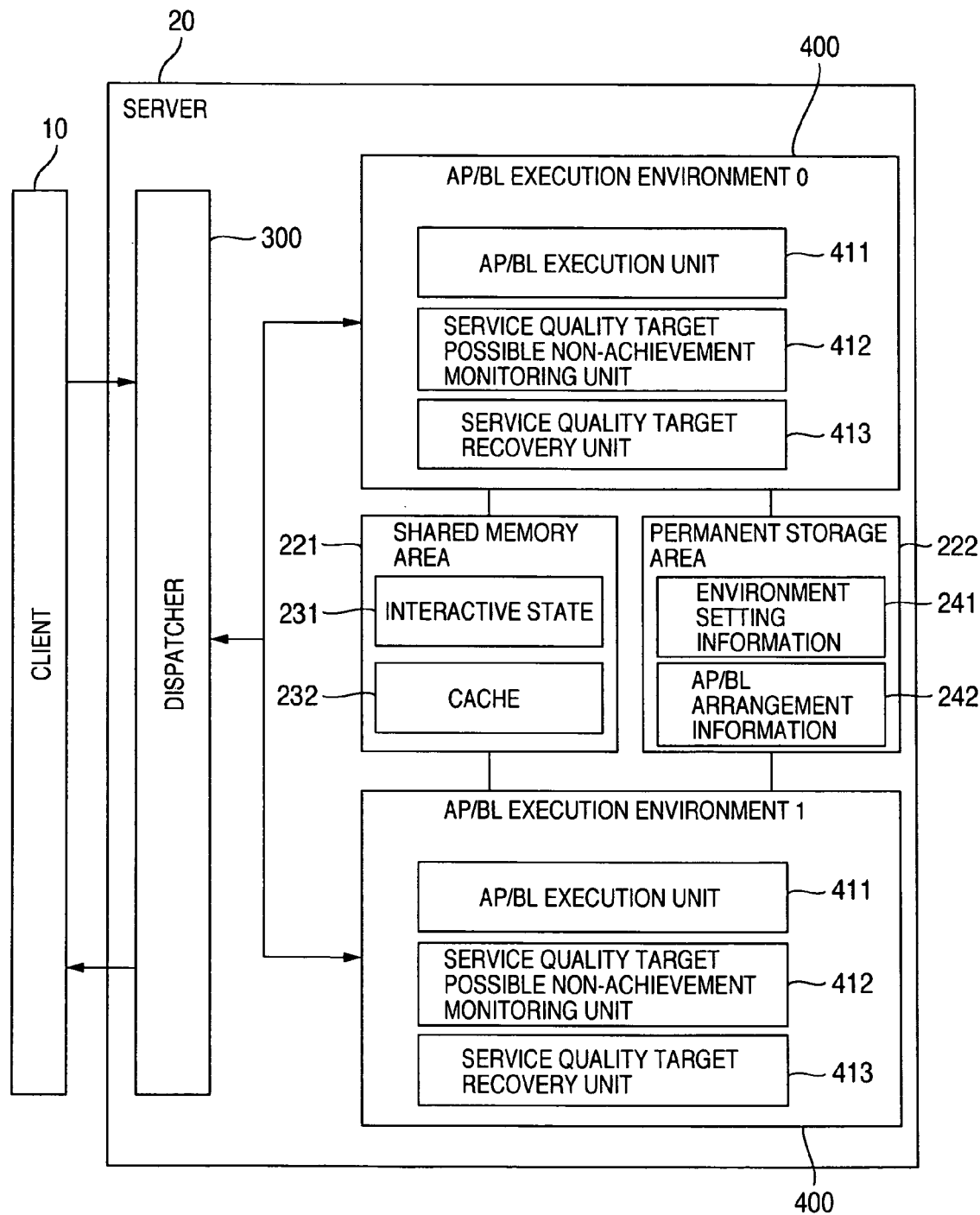
FIG. 3 is a block diagram explaining configuration of the server 20.

FIG. 3 shows configuration of the server 20 according to the present embodiment. As shown in this figure, the server 20 includes a dispatcher 300 as a request reception window from the client 10, and two business AP/BL execution environments 400. Moreover, the AP/BL execution environments 400 include an AP/BL execution unit 411, a service quality target possible non-achievement monitoring unit 412, and a service quality target recovery unit 413.

The dispatcher 300 receives a request transmitted from the client 10 and distributes the received request to one of the AP/BL execution environments 400. It should be noted that in the explanation below, the AP/BL execution environment 400 to which a request from the dispatcher 300 is distributed will be called an active AP/BL execution environment 400 while the other AP/BL execution environment 400 will be called a standby AP/BL execution environment 400. Moreover, when a service quality target possible non-achievement detection event has occurred, the dispatcher 300 switches the AP/BL execution environment 400 as a destination to which the request is distributed (hereinafter, referred to as active/standby switching or system switching). It should be noted that the dispatcher 300 itself will be detailed later.

The AP/BL execution unit 411 executes a business application program and a business logic program in accordance with the request distributed from the dispatcher 300.

The service quality target possible non-achievement monitoring unit 412 judges whether a predetermined processing efficiency can be assured (a predetermined service quality can be achieved) for information processing (service) by the business application program and the business logic program executed in accordance with the request distributed from the dispatcher 300.

The service quality target possible non-achievement monitoring unit 412 monitors use condition of resources such as the size of an area in use among the memory allocated in the AP/BL execution environment 400, the number of file descriptors for the file opened by the program being executed in the AP/BL execution environment 400, the number of exclusive locks assured by exclusive control for a transaction of the database for example, use ratio of the CPU 201, the number of threads executed in the AP/BL execution environment 400. When these values exceed a predetermined value (satisfy a predetermined condition), it is judged that a predetermined processing efficiency cannot be realized. It should be noted that the service quality target possible non-achievement monitoring unit 412 may make judgment according to the result of total of the use amount of the various resources. It is assumed that the conditions such as the aforementioned threshold values are stored in advance in a storage area provided by the main storage device 202 or the secondary storage device 203.

When the service quality target possible non-achievement monitoring unit 412 judges that a predetermined service quality cannot be achieved for the service in the AP/BL execution environment 400, it generates an event and notifies it to the dispatcher 300. It should be noted that in the explanation below, this event will be called a service quality target possible non-achievement detection event.

The service quality target recovery unit 413 performs processing so as to assure a predetermined processing efficiency (such as a response time and a throughput) in the information processing by the program executed in the AP/BL execution environments 400. The service quality target recovery unit 413 performs, for example, forced garbage collection in the memory area, restart of AP/BL execution environments 400, optimization of data used in the AP/BL execution environment 400, and optimal rearrangement of data stored in various memories.

It should be noted that the dispatcher 300 and the AP/BL execution environments 400 may transmit/receive a request and a response or notify an event to each other by using an inter-process communication such as a pipe.

Moreover, as shown in FIG. 3, the shared memory area 221 stores an interactive state 231 and a cache 232 as various data concerning the service provided by the AP/BL execution environment 400. The interactive state 231 is information to be inherited in the execution process of the program for a series of requests (session) transmitted from the client 10. The interactive state 231 may be, for example, session information and a state full session object defined in the J2EE®. In this embodiment, since the interactive state 231 is stored in the shared memory area 221 which can be accessed from the two AP/BL execution environments 400, the interactive state 231 may be inherited in the standby AP/BL execution environment even when the active/standby switching is performed.

The permanent storage area 222 contains environment setting information 241 and AP/BL arrangement information 242. The AP/BL execution environments 400 read the same environment setting information 241 and the AP/BL arrangement information 242 so as to execute various programs such as the application program and the business logic program. The permanent storage area 222 is realized, for example, as a file on a file system provided by the operating system (OS).

===Dispatcher 300===

Figure 4:
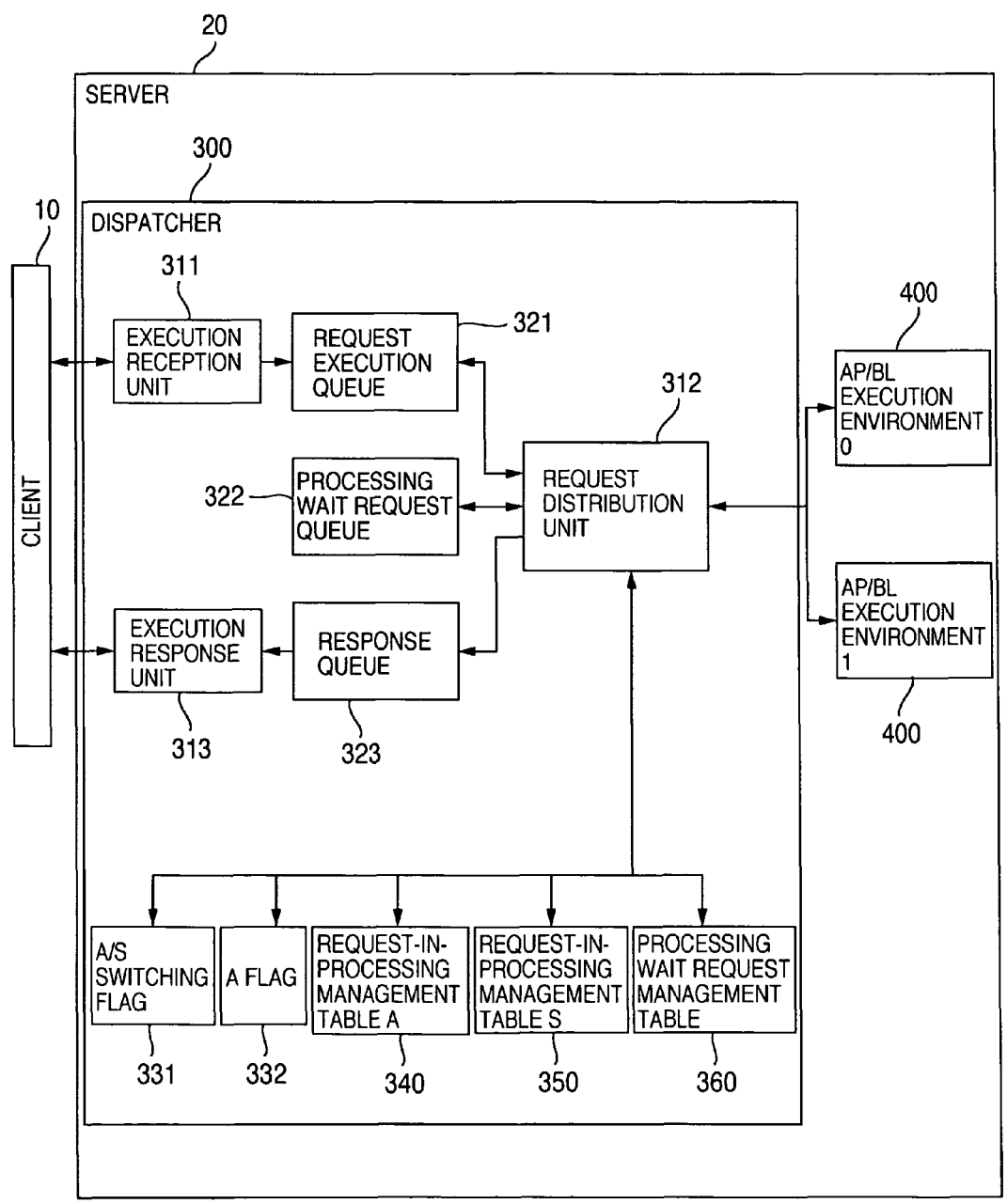
FIG. 4 shows detailed configuration of a dispatcher 300.

FIG. 4 shows configuration of the dispatcher 300. As shown in FIG. 4, the dispatcher 300 includes a request reception unit 311, a request distribution unit 312, a request response unit 313, a request execution queue 321, a processing wait request queue 322, a response queue 323, an A/S switching flag 331, an A flag 332, a request-in-processing management table A 340, a request-in-processing management table S 350, and a processing waiting request management table 360.

The request reception unit 311 receives a request transmitted from the client 10. The request distribution unit 312 distributes the request received by the request reception unit 311 to the active AP/BL execution environment 400. The request response unit 313 transmits a response to the request from the AP/BL execution environment 400, to the client 10.

In the request execution queue 321, the request from the client 10 received by the request reception unit 311 is registered. In the response queue 323, the response from the AP/BL execution environment 400 is registered. In the processing wait request queue 322, the request is temporarily registered when the active/standby switching which will be detailed later is performed.

The A/S switching flag 331 is information indicating whether the active/standby switching is being performed and may be "true" or "false" (the initial value is "false").

The A flag 332 is information indicating the active AP/BL execution environment 400. When the active AP/BL execution environment 400 is an AP/BL execution environment 0 (400), the A flag 332 becomes "0". Otherwise, the A flag 332 is "1".

Figure 5:
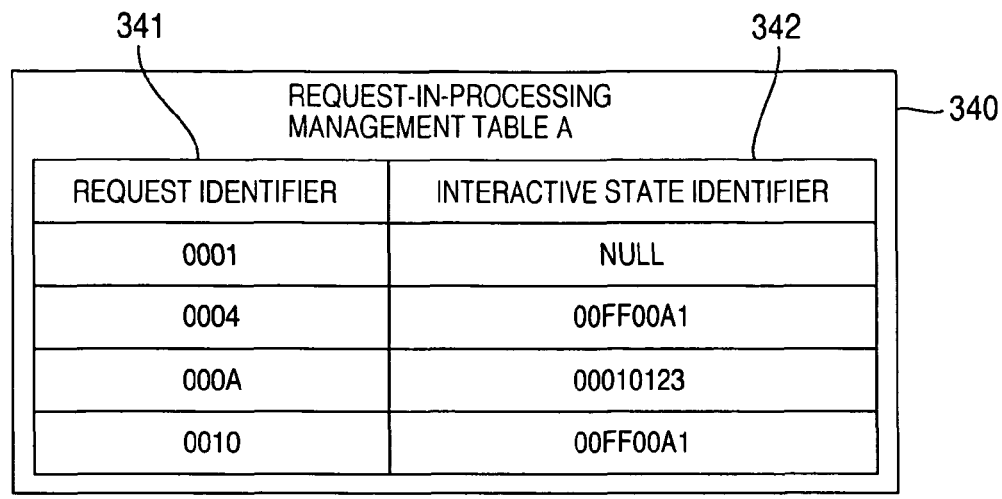
FIG. 5 is a table for managing a request being processed in an active business AP/BL execution environment 400.

The request-in-processing management table A 340 manages a request distributed to the active business AP/BL execution environment 400. FIG. 5 shows configuration of the request-in-processing management table A 340. The request-in-processing management table A 340 contains an identifier (hereinafter, referred to as a request identifier) 341 of the request from the client 10 and an identifier (hereinafter, referred to as an interactive state identifier) of the interactive state 231 stored in the shared memory area 221. The request-in-processing management table A 340 contains one record for each request being processed in the active business AP/BL execution environment 400. In this embodiment, when a new request is received and the interactive state 231 is not stored, "NULL" is set for the interactive state identifier 342. Moreover, as will be described later, when the program for the request in the AP/BL execution environment 400 is complete, the record corresponding to the request identifier of the request is deleted from the request-in-processing management table A 340.

Figure 6:
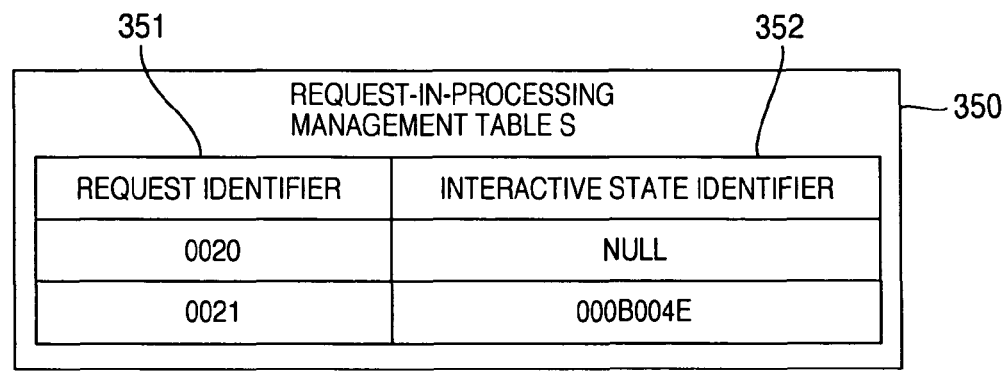
FIG. 6 is a table for managing a request being processed in a standby business AP/BL execution environment 400.

The request-in-processing management table S 350 manages a request distributed to the standby business AP/BL execution environment 400 while active/standby switching is being performed. FIG. 6 shows configuration of the request-in-processing management table S 350. Like the request-in-processing management table A 340, the request-in-processing table S 350 contains a record stored while being correlated to a request identifier 351 and an interactive state identifier 352 is registered for each request.

Figure 7:
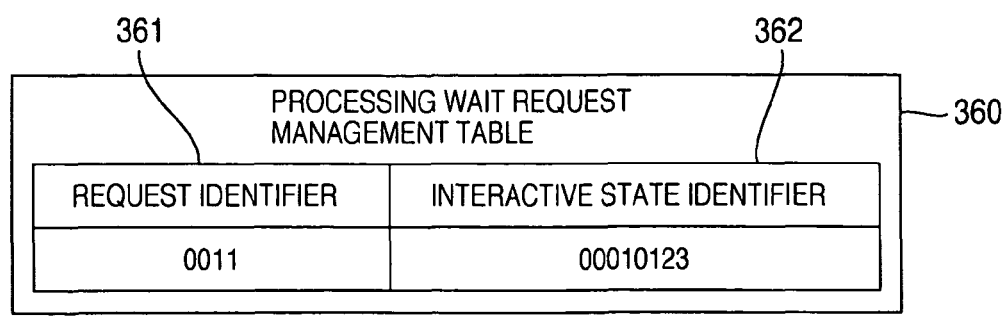
FIG. 7 is a table for managing a request which is temporarily wait during active/standby switching.

The processing wait request management table 360 manages a request for temporarily suspending a distribution during the active/standby switching processing. FIG. 7 shows configuration of the processing wait request management table 360. Like the aforementioned request-in-processing management table A 340 and the request-in-processing table S 350, the processing wait request management table 360 stores a request identifier 361 and an interactive state identifier 362 in relation to each other.

===Start Processing===

Figure 8:
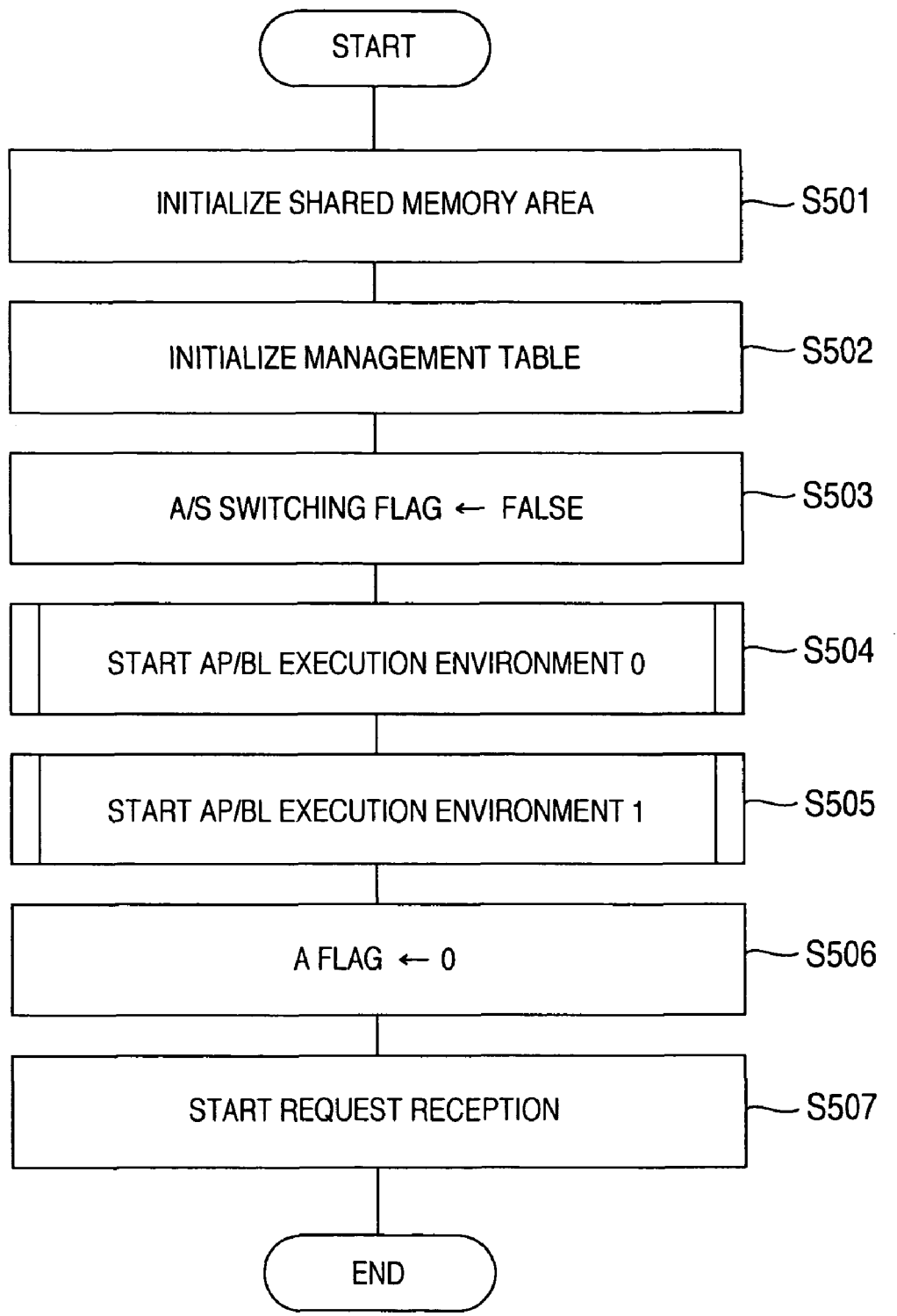
FIG. 8 is a flowchart showing a flow of start processing of the dispatcher 300.

FIG. 8 shows a flow of start processing of the dispatcher 300. The dispatcher 300 acquires and initializes the shared memory area 221 (S501), initializes the request-in-processing management table A340, the request-in-processing management table S 350, and the processing wait request management table 360 (S502), and initializes the A/S switching flag 331 to "false" (S503). The dispatcher 300 starts the AP/BL execution environment 0 (400) (S504), starts the AP/BL execution environment 1 (400) (S505), and initializes A flag 332 to "0" so as to set the active AP/BL execution environment 400 (S506). When the aforementioned processes are complete, the dispatcher 300 starts receiving a request from the client 10 (S507).

Figure 9:
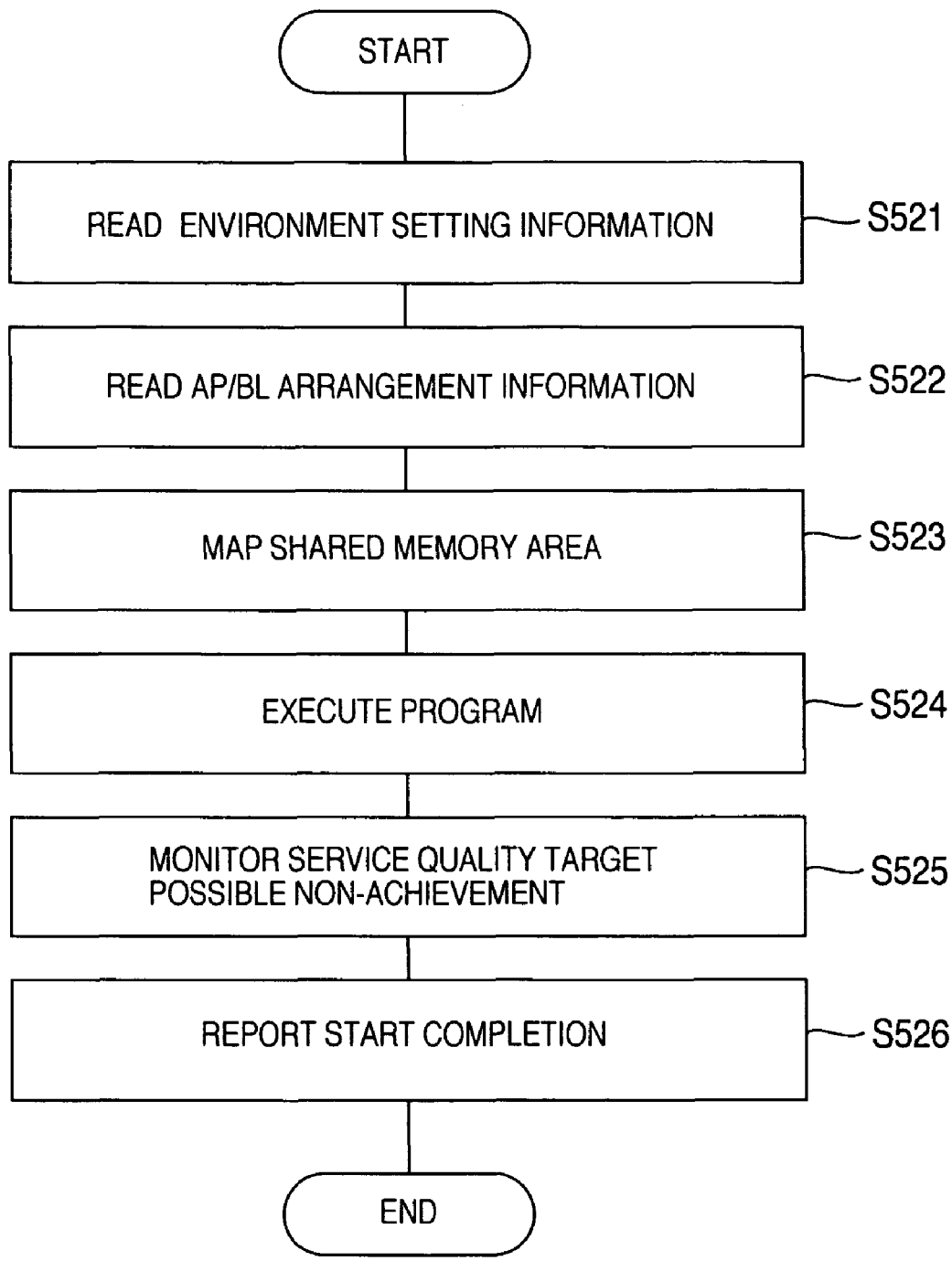
FIG. 9 is a flowchart showing a flow of start processing of the business AP/BL execution environment 400.

FIG. 9 shows a flow of start processing of the AP/BL execution environment 400. The AP/BL execution environment 400 reads in the environment setting information 241 arranged in the permanent storage area 222 (S521), reads in the AP/BL arrangement information (S522), and performs initialization for executing the program. The AP/BL execution environment 400 maps the shared memory area 221 onto its own address space (S523). The AP/BL execution environment 400 starts various services provided to the application program and the business logic program and execution of the programs such as the AP and the BL (S524), executes a program for realizing the service quality target possible non-achievement monitoring unit 412 (S525), and notifies to the dispatcher 300 that the start processing of the AP/BL execution environment 400 is complete (S526).

===Service Quality Target Possible Non-Achievement Monitoring===

Figure 10:
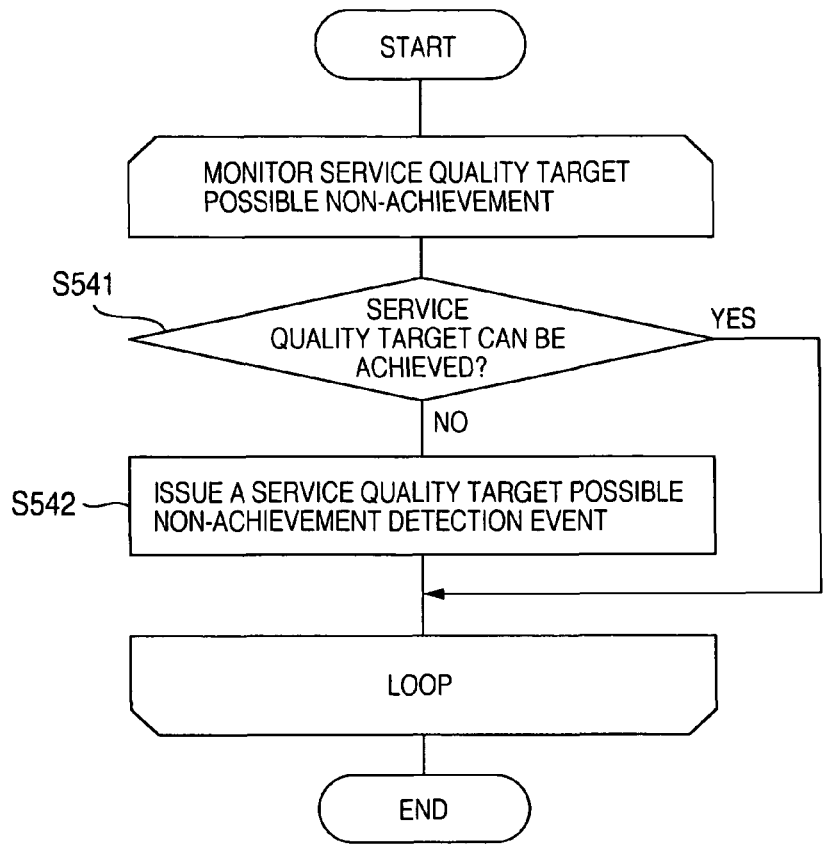
FIG. 10 is a flowchart showing a flow of the processing of a service quality target possible non-achievement monitoring unit 412.

FIG. 10 shows a flow of processing by the service quality target possible non-achievement monitoring unit 412 of each AP/BL execution environment 400. When the AP/BL execution environment 400 is started, in each of the AP/BL execution environments 400, the service quality target possible non-achievement monitoring unit 412 measures the use amount of resources allocated tot he AP/BL execution environment 400 and judges whether the service quality target can be achieved by checking whether the use amounts exceed a predetermined threshold value (S541). When the service quality target possible non-achievement monitoring unit 412 judges that the service quality target can not be achieved (No in S541), it issues a service quality target possible non-achievement detection event (S542). It should be noted that the service quality target possible non-achievement monitoring unit 412 may total the use amounts of various resources and judge whether the service quality target can be achieved according to the total result.

Figure 11:
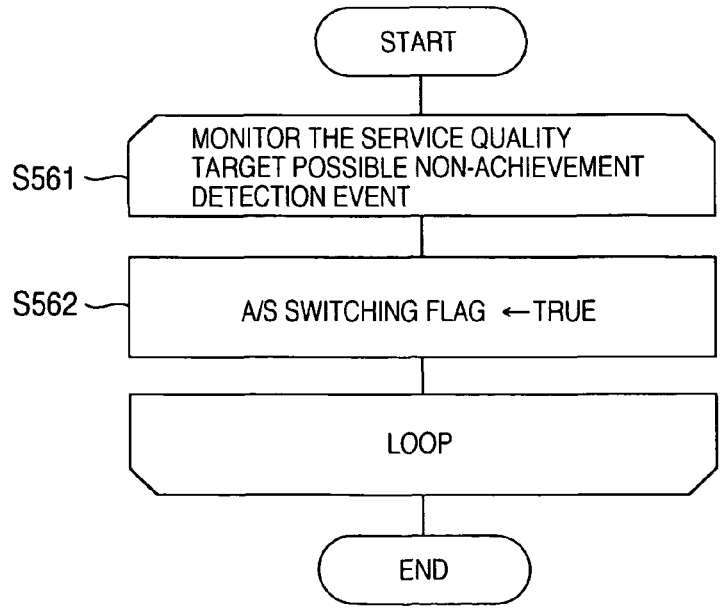
FIG. 11 is a flowchart showing a flow of processing of the dispatcher 300 when a service quality target possible non-achievement detection event has occurred.

FIG. 11 shows processing performed by the dispatcher 300 when a service quality possible non-achievement detection event is caused in the AP/BL execution environments 400. Upon detection of the service quality possible non-achievement detection event (S561), the dispatcher 300 sets the A/S switching flag 331 to "true" (S562).

===Request Distribution Processing===

Figure 12:
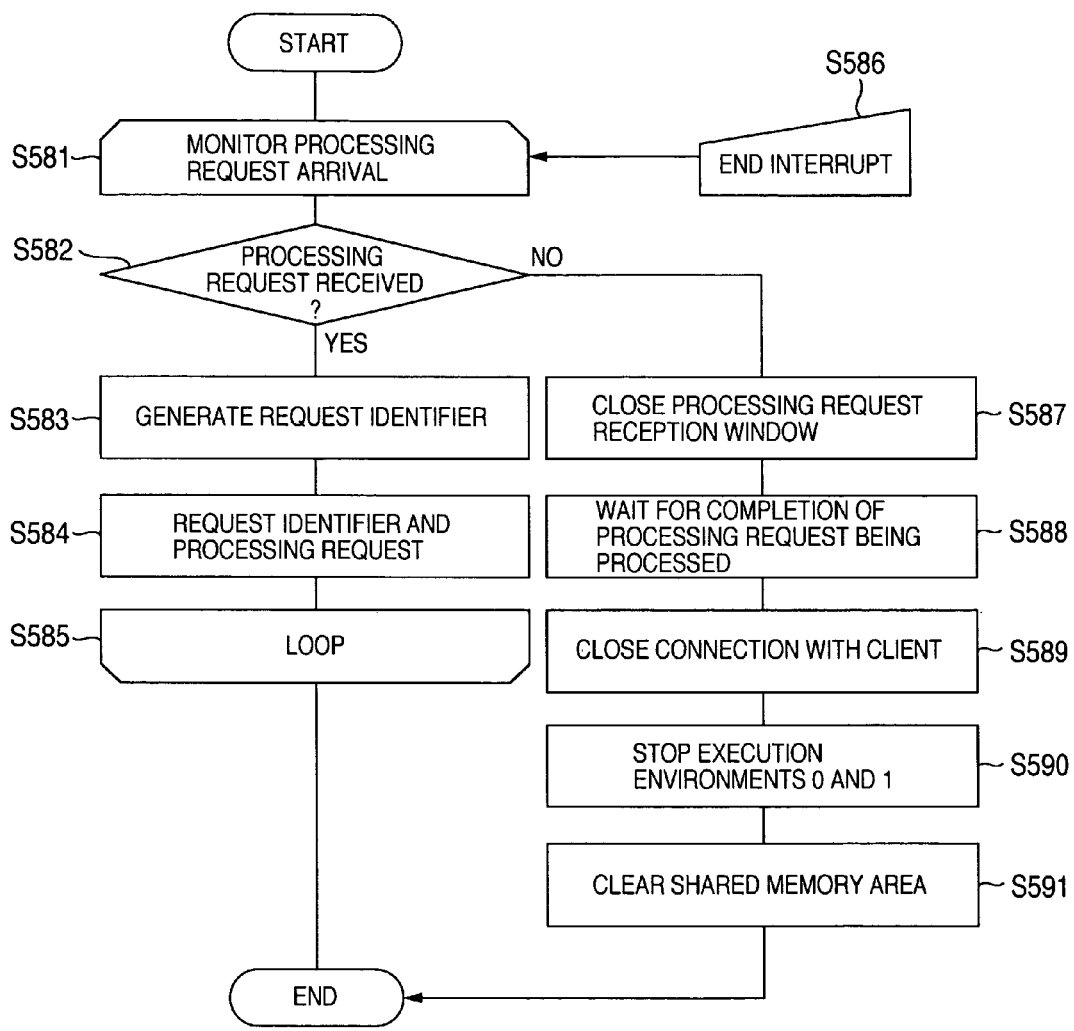
FIG. 12 is a flowchart showing a flow of the processing for monitoring arrival of a request from a client 10 by the dispatcher 300.

Upon reception of the notification of the start complete from each of the AP/BL execution environments 400, the dispatcher 300 monitors arrival of a request from the client 10 shown in FIG. 12.

The request reception unit 311 monitors arrival of a request from the client (S581). When the request reception unit 311 has received a request from the client (Yes in S582), it generates a request identifier uniquely identifying the received request (S583), registers the request identifier and the request on the request execution queue 321 (S584), and again monitors arrival of a request from the client (S585).

On the other hand, when the dispatcher 300 receives an end interrupt (S586) while monitoring arrival of a request from the client 10, it closes the window for receiving a request from the client 10 (S587), and waits until the processing performed by the AP and BL in the AP/BL execution environments 400 is complete or time out occurs. For example, the dispatcher 300 may detect that all the processes performed by the AP and BL in the AP/BL execution environment 400 are complete when the request-in-processing management table A 340, the processing request management table S 350, the processing wait request management table 360, the request execution queue 321, and the response queue 323 all have become empty. When the dispatcher 300 is continuously connected to the client 10, the connection is closed (S589), the AP/BL execution environments 400 are stopped (S590), and the shared memory area 221 is cleared (S591), then the processing of the dispatcher 300 is terminated.

Figure 13:
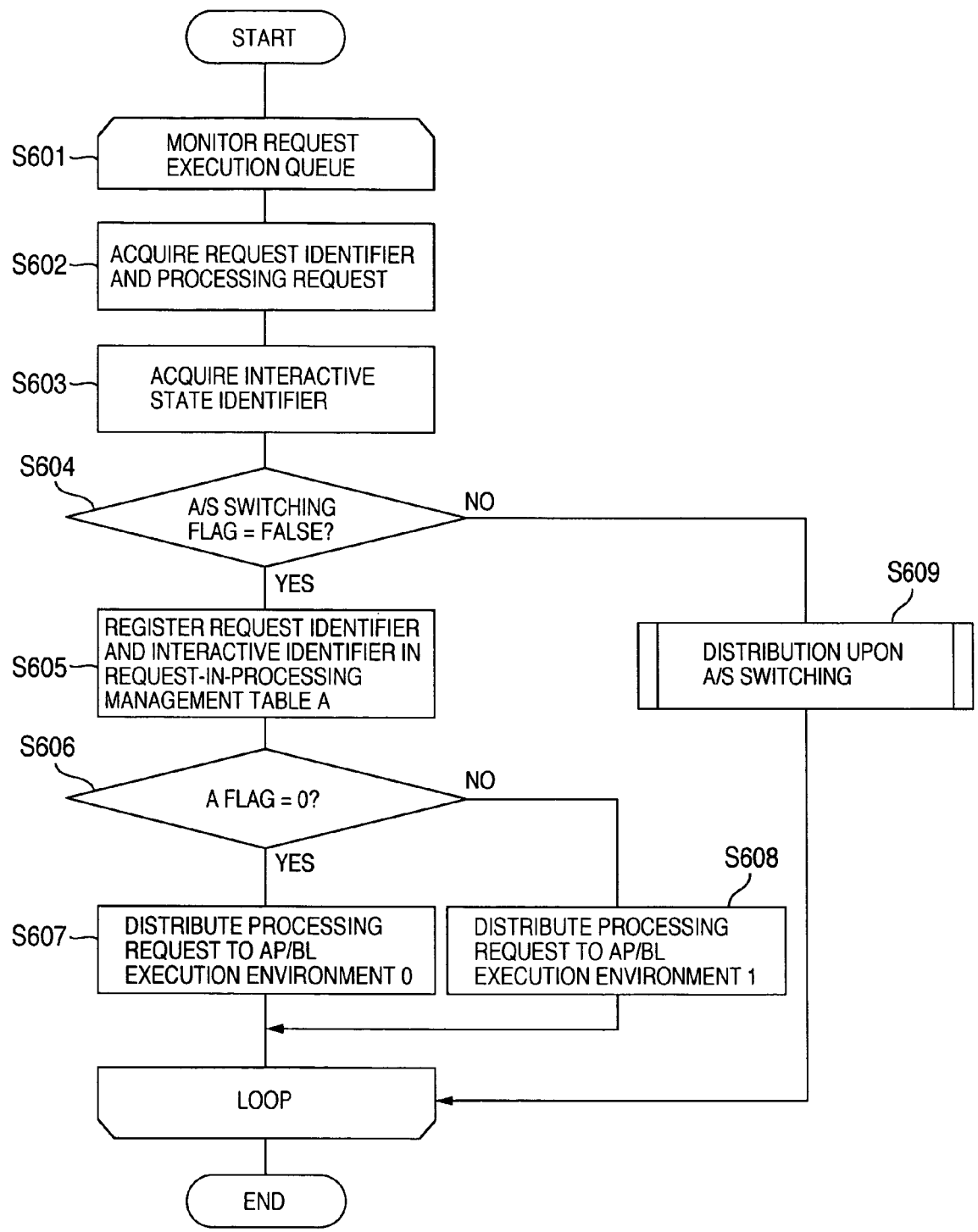
FIG. 13 is a flowchart showing a flow of the distribution processing of the requests by the dispatcher 300.
Figure 14:
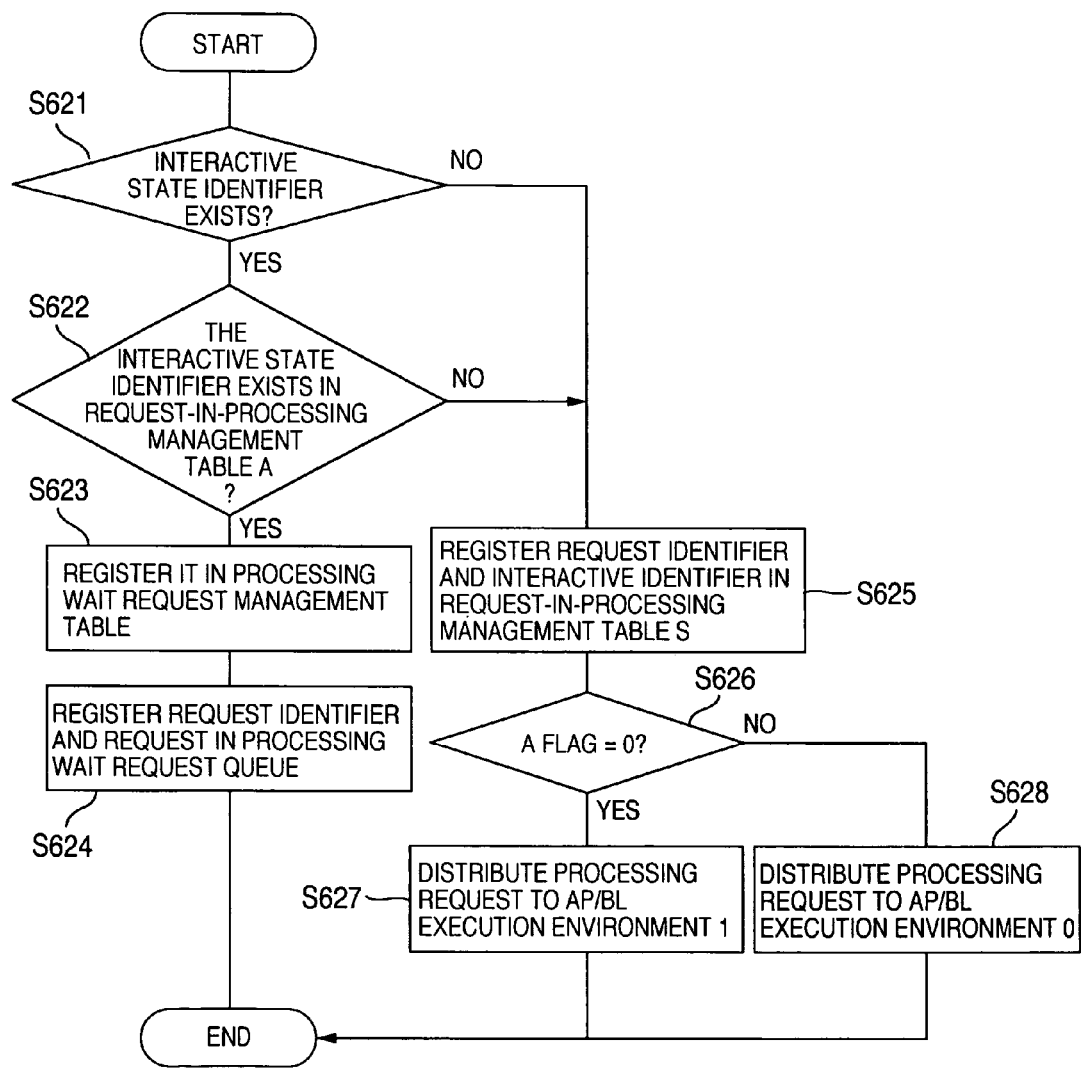
FIG. 14 is a flowchart showing a flow of distribution processing during active/standby switching.

The request registered in the request execution queue 321 is distributed to the AP/BL execution environments 400 by the request distribution unit 312 of the dispatcher 300. FIG. 13 shows a flow of the request distribution.

When a request identifier and a request are registered in the request execution queue 321 (S601), the request distribution unit 312 extracts the request identifier and the request from the request execution queue 321 (S602) and acquires the interactive state identifier attached to the extracted request (S603).

If the A/S switching flag 331 is "false" (Yes in S604), the request distribution unit 312 registers the request identifier and the interactive state identifier in the request-in-processing management table A 340 (S605). Here, if the request extracted from the request execution queue 321 has no interactive state identifier, "NULL" is registered in the interactive state identifier column 342 in the request-in-processing management table A 340.

If the value of the A flag 332 is "0" (Yes in S606), the request distribution unit 312 distributes a request to the AP/BL execution environment 0 (400) (S607). Otherwise (No in S606), the request distribution unit 312 distributes the request to the AP/BL execution environment 1 (400) (S608).

On the other hand, if the A/D switching flag 331 is "true" (No in S604), the request distribution unit 312 performs the distribution processing upon active/standby switching (S609).

If the aforementioned request has the interactive state identifier (Yes in S621) and the interactive state identifier is registered in the request-in-processing management table A 340 (Yes in S622), then the request distribution unit 312 registers the request identifier and the interactive state identifier in the processing wait request management table 360 (S623), attaches a request identifier to the request, and registers it in the processing wait request queue 322 (S624).

On the other hand, if the request has no interactive state identifier (No in S621) or if the interactive state identifier is not registered in the request-in-processing management table A 340 (No in S622), then the request distribution unit 312 registers the request identifier and the interactive state identifier in the request-in-processing management table S 350 (S625). Here, if the request extracted from the request execution queue 321 has no interactive state identifier, "NULL" is registered in the interactive state identifier column 352 of the request-in-processing management table S 350. If the value of the A flag 332 is "0" (Yes in S626), the request distribution unit 312 distributes the request to the AP/BL execution environment 1 (400). Otherwise, it distributes the request to the AP/BL execution environment 0 (400).

Thus, the request having the interactive state identifier identical to the request allocated to the active AP/BL execution environment 400 is registered in the processing wait request queue 322 and distribution to the standby AP/BL execution environment 400 is temporarily suspended. This prevents simultaneous execution of processes which may access the same interactive state 231 in the two AP/BL execution environments. Accordingly, it is possible to eliminate the need of exclusive control for the interactive state 231, thereby reducing the processing load associated with exclusive control and rapidly performing the active/standby switching.

===Program Execution in Accordance with a Request===

Figure 15:
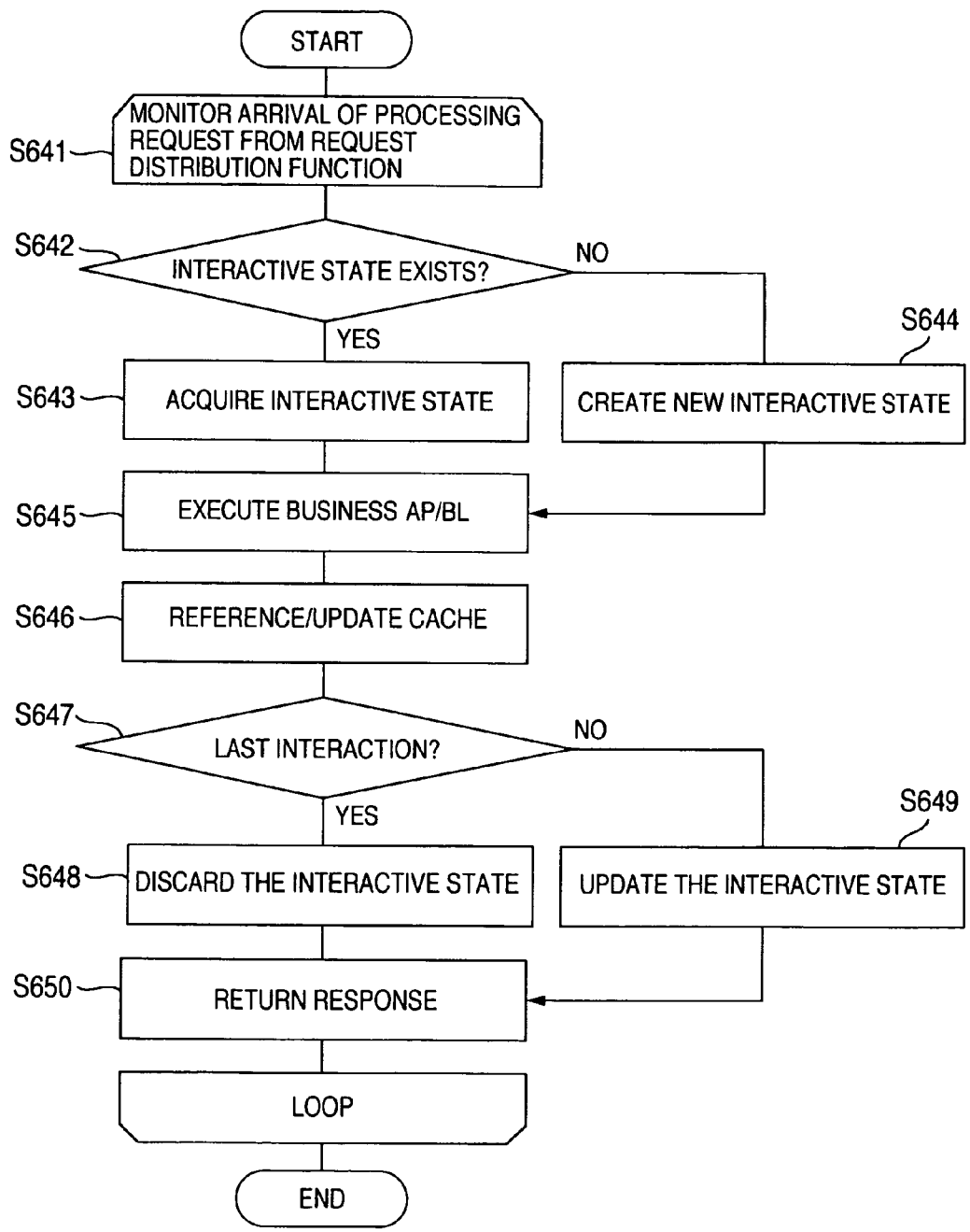
FIG. 15 is a flowchart showing a flow of execution of a program according to a request by the AP/BL execution environment 400.

FIG. 15 shows a flow of program execution in accordance with a request distributed from the dispatcher 300 in the AP/BL execution environments 400. It should be noted that the program execution in the AP/BL execution environments 400 shown in FIG. 15 is similar to program execution by an ordinary application server or the like.

The AP/BL execution environments 400 have an AP/BL execution unit 411. When a request is distributed from the request distribution unit 312 (S641), the AP/BL execution unit 411 judges whether an interactive state 231 corresponding to the request exists depending on whether the distributed request has an interactive state identifier (S642). When an interactive state 231 exists (Yes in S642), the interactive state 231 is acquired from the shared memory area 221 (S643).

Otherwise (No in S642), a new interactive state 2231 is created in the shared memory area 221 (S644).

The AP/BL execution unit 411 executes the AP or the BL according to the request (S645). When the AP and the BL use various services provided by the AP/BL execution environments 400, in the information processing performed by executing the AP and the BL, the cache 232 stored in the shared memory area 221 is accessed (S646).

The AP/BL execution unit 411 judges whether the allocated request is the last one of the requests transmitted from the client 10 (S647). This judgment is made, for example by executing processing to discard a session in the AP and the BL or time out. When the AP/BL execution unit 411 judges that the request is the last one (Yes in S647), it deletes the interactive state 231 from the shared memory area 221 (S648). Otherwise (No in S647), it updates the interactive state 231 stored in the shared memory area 221 (S649). The AP/BL execution unit 411 creates a response for the request and passes it to the request distribution unit 312 of the dispatcher 300 (S650).

As has been described above, a program corresponding to the request from the client 10 is executed in the AP/BL execution environments 400 and various information processes are performed.

===Response Processing===

Figure 16:
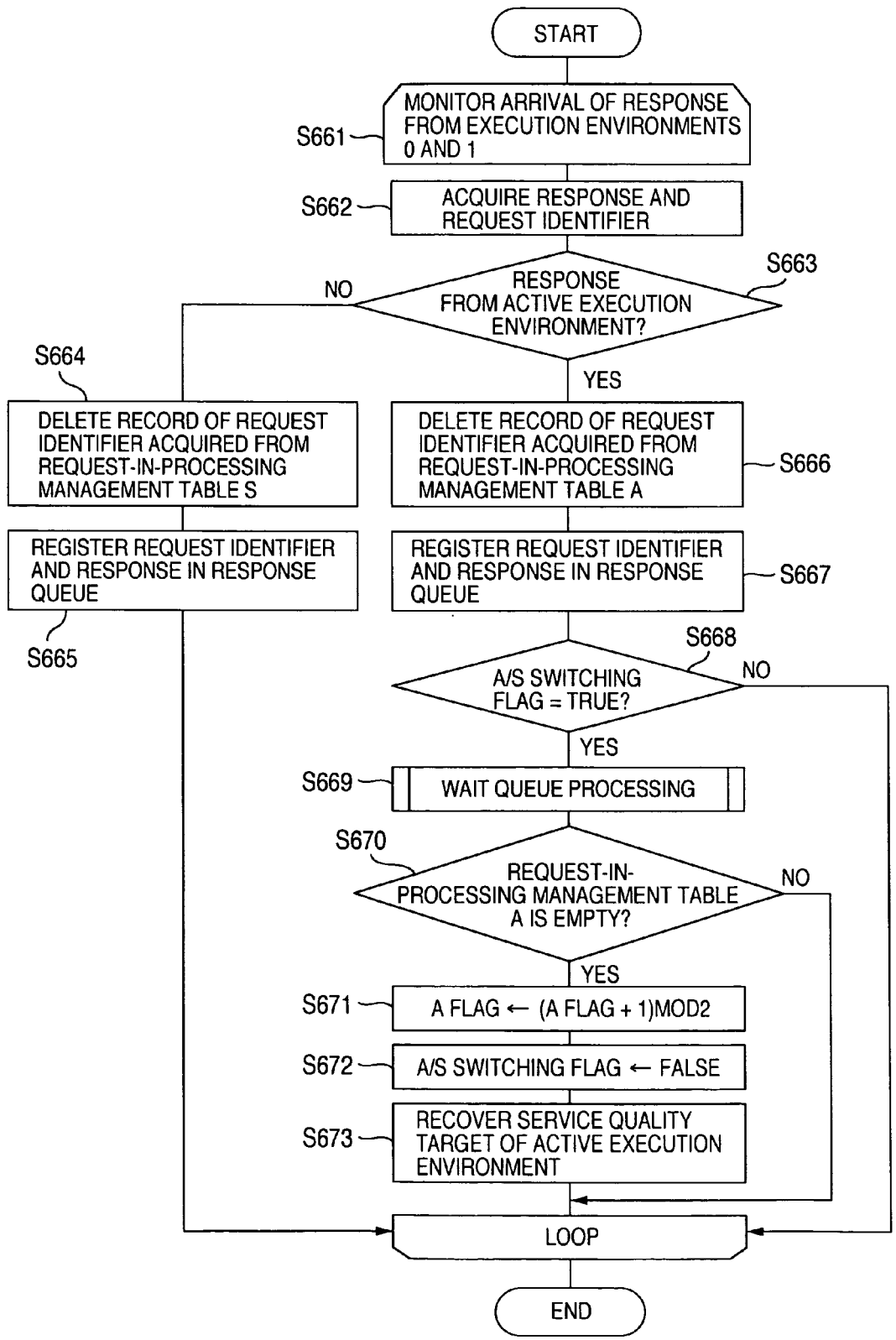
FIG. 16 is a flowchart showing a flow of the response monitoring processing by the dispatcher 300.

When the response is passed from the AP/BL execution environment 400, the request distribution unit 312 of the dispatcher 300 performs the processing shown in FIG. 16.

When the request distribution unit 312 receives the response from the AP/BL execution environment 400 (S661), it acquires a request identifier attached to the response received (S662). The request distribution unit 312 references the A flag 332 and judges whether the AP/BL execution environment 400 which has made a response is in the active or standby mode (S663). When the response is received from the standby AP/BL execution environment 400 (No in S663), the record corresponding to the aforementioned request identifier is deleted from the request-in-processing management table S 350 (S664) and the request identifier and the response are registered in the response queue 323 (S665).

On the other hand, when the response is from the active AP/BL execution environment 400 (Yes in S663), the request distribution unit 312 deletes the record corresponding to the aforementioned request identifier from the request-in-processing management table A 340(S666) and registers the aforementioned request identifier and the response in the response queue 323 (S667).

Figure 17:
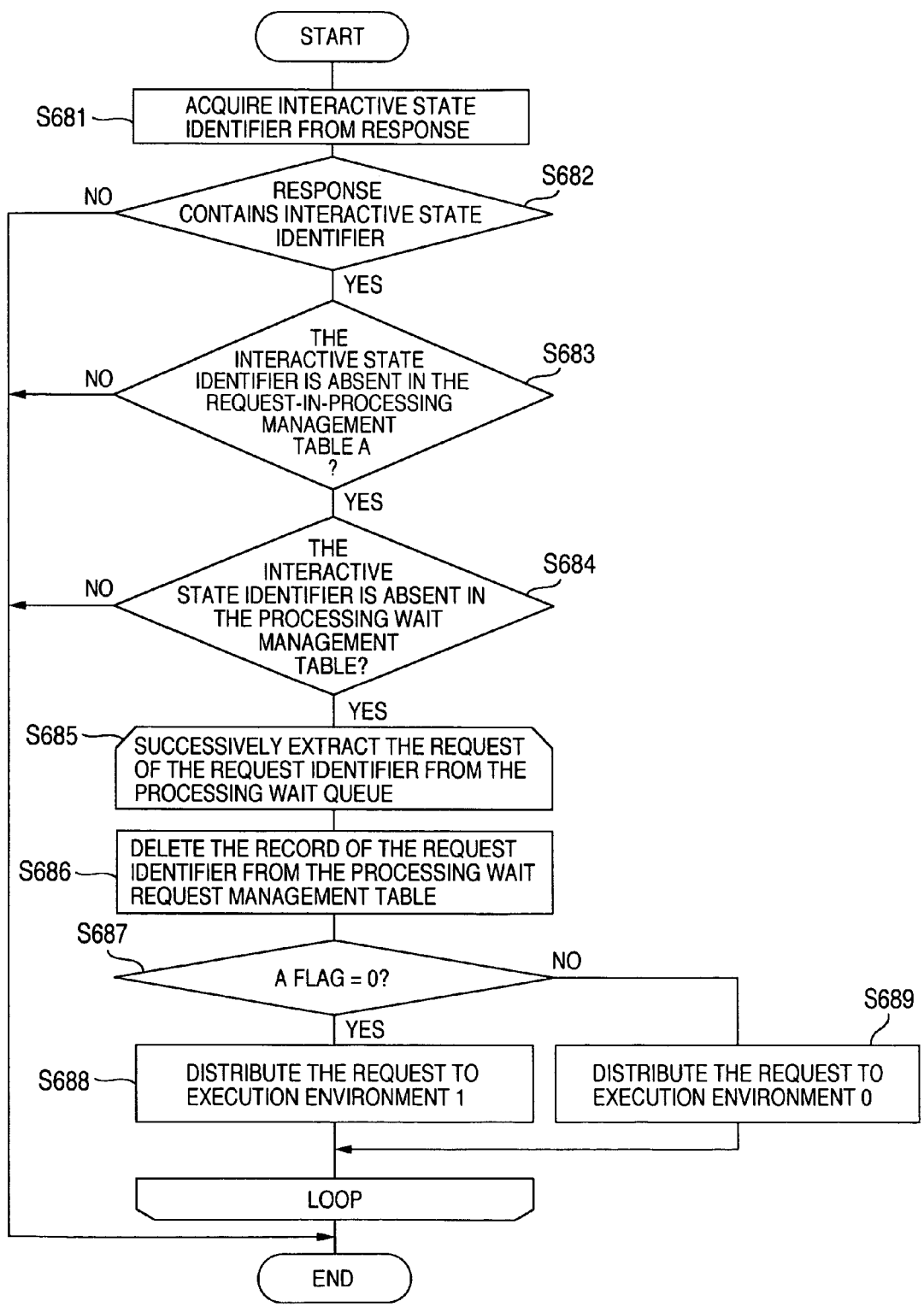
FIG. 17 is a flowchart showing a flow of wait queue processing.

When the A/S switching flag 331 is "true" (Yes in S668), the request distribution unit 312 performs the wait queue processing shown in FIG. 17 (S669).

In the wait queue processing, the request distribution unit 312 acquires the interactive state identifier attached to the response (S681). If the acquired interactive state identifier is other than "NULL" (Yes in S682), and if the interactive state identifier is not registered in the request-in-processing management table A 340 (Yes in S683), and if the interactive state identifier is registered in the processing wait request management table 360 (Yes in S684), then requests corresponding to the aforementioned request identifier are successively acquired from the processing wait request queue 322 (S685) and the record corresponding to the request identifier is deleted from the processing wait request management table 360 (S686). If the A flag 332 is "0" (Yes in S687), the request is distributed to the AP/BL execution environment 1 (400) (S688). If the A flag 332 is "1" (No in S678), the request is distributed to the AP/BL execution environment 0 (400), so that the request is distributed to the standby AP/BL execution environment 400.

Next, if the request identifier is not registered in the request-in-processing management table A340 (No in S670), then the request distribution unit 312 sets ((value of A flag 332+1)mod 2)) as the value indicating the standby AP/BL execution environment 400 to the A flag 332, makes the A/S switching flag 331 "false" (S672), and complete the replacement of the active AP/BL execution environment 400 with the standby AP/BL execution environment 400. Here, the request distribution unit 312 notifies that the active AP/BL execution environment 400 is replaced by the standby AP/BL execution environment 400 to the AP/BL execution environment 400 which has become in the standby mode. The service quality target recovery unit 413 of the AP/BL execution environment 400 which has received the notification performs, for example, forced garbage collection of the memory area, restart of the AP/BL execution environment 400, optimization of the cache 232 stored in the shared memory area 221, optimization of the data stored in various memories, and other processes for achieving the service quality target such as a predetermined response time and throughput (S673). Thus, the AP/BL execution environment 400 which has become from active to standby mode can achieve the serve quality target. When the processing efficiency is lowered in the AP/BL execution environment 400 which has become from standby to active mode, the active/standby switching is performed as has been described above and the service quality is maintained.

Figure 18:
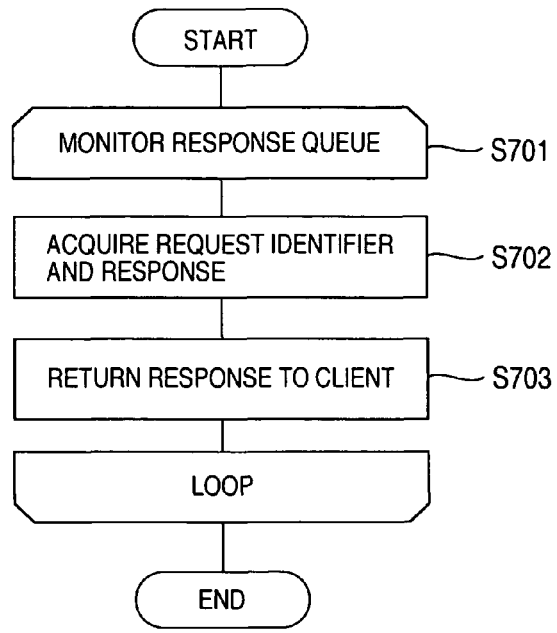
FIG. 18 is a flowchart showing a flow of response queue monitoring processing.

When the response from the AP/BL execution environment 400 is registered in the response queue 323, the request response unit 313 of the dispatcher 300 transmits the response to the client 10. FIG. 18 shows a flow of response processing performed by the request response unit 313. When the response is registered in the response queue 323 (S701), the request response unit 313 acquires the request identifier and the response from the response queue 323 (S702) and transmits the acquired response to the client 10 (S703).

===Other Configuration Examples of Information Processing System===

It should be noted that the server 20 according to the present embodiment may be replaced by a server computer implementing an application server in the information processing system of the ordinary configuration. Accordingly, the conventional technique for high availability and high reliability may be employed as it is.

Figure 19:
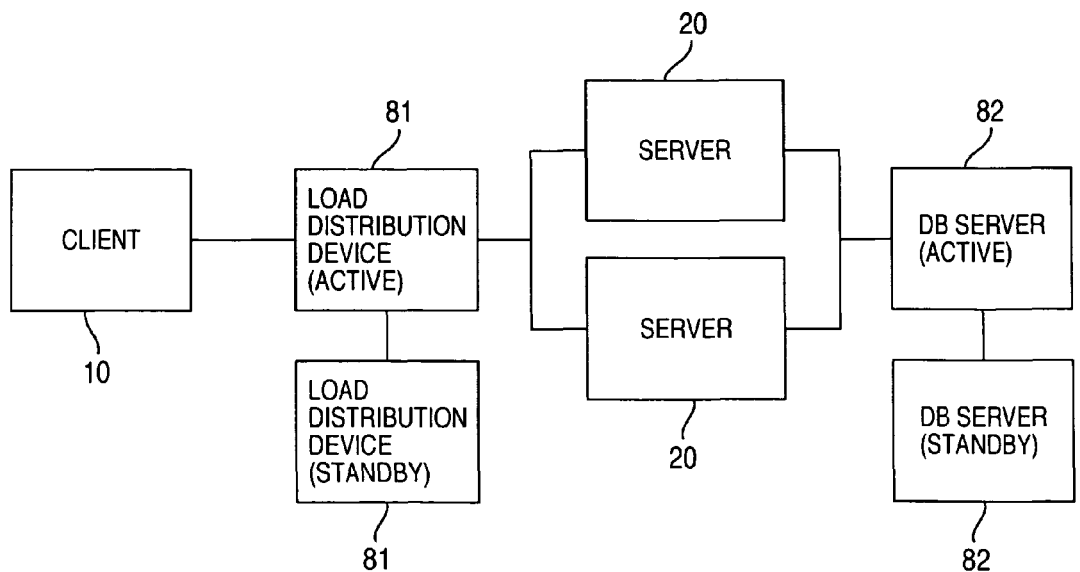
FIG. 19 is a block diagram showing an example of configuration of an information processing system.

For example, as shown in FIG. 19, it is also possible to use a plurality of servers 20 of the present embodiment. The information processing system shown in FIG. 19 includes a dual load distribution device 81, a horizontally scaled server 20, and a dual database server 82. Even in such information processing system having high availability and high reliability, the server 20 of the present embodiment may be applied transparently.

Figure 20:
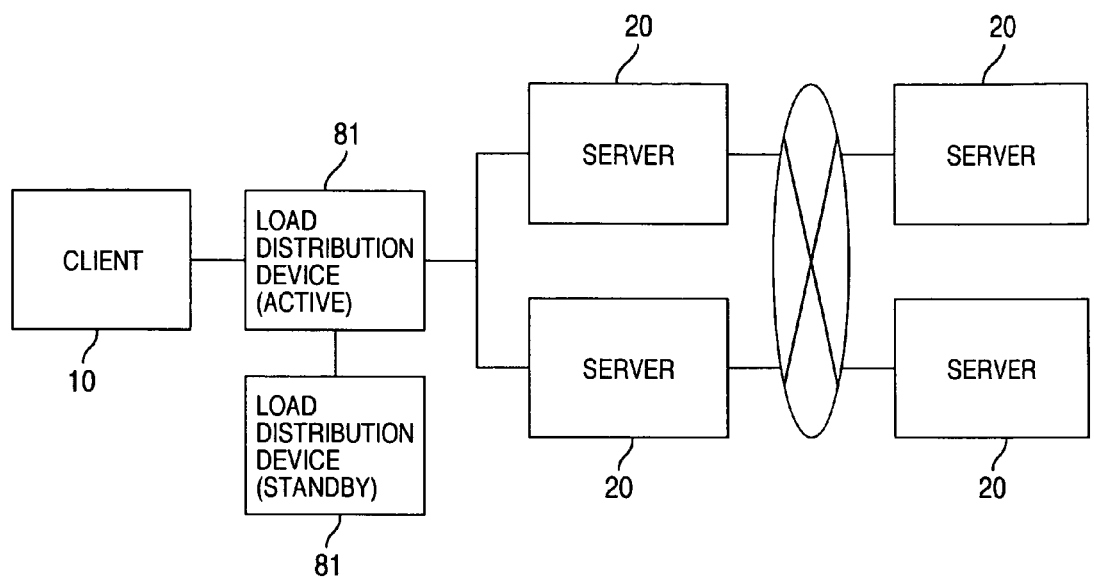
FIG. 20 is a block diagram showing an example of configuration of an information processing system.

Moreover, as shown in FIG. 20, the server 20 of the present embodiment may also be employed in the information processing system in which the server computer for executing the business application program is separated from the server computer for executing the business logic program.

Explanation has thus far been described on the present embodiment. However, the aforementioned embodiment is given for simplify the understanding of the present invention. The present invention is not to be limited to this embodiment.

The present invention may be modified and improved without departing from its spirit. The present invention also includes its equivalents.

The invention claimed is:

1. An information processing method performed in a server computer communicably connected to a client computer, the server computer having a first execution environment and a second execution environment for executing a program for performing information processing in accordance with a series of processing requests transmitted from the client computer, the information processing method comprising steps of:

storing a condition for judging whether a predetermined processing efficiency is assured for the information processing performed by the first execution environment according to the processing requests;

receiving the series of processing requests transmitted from the client computer;

judging whether the predetermined processing efficiency is assured according to the condition;

allocating a predetermined processing request of the series of processing requests to the first execution environment when it is judged that the predetermined efficiency is assured with the first execution environment according to the condition;

storing a session identifier identifying a series of sessions to which the predetermined processing request allocated to the first execution environment belongs therein; and when the server computer judges that the predetermined processing efficiency cannot be assured with the first execution environment according to the condition, storing data inherited between the series of processing requests, in a storage area accessible from the first execution environment and the second execution environment, and judging whether the session identifier identifying the session to which the processing request received from the client is stored; and when the session identifier is stored, a preventing the predetermined processing request from being allocated to the second execution environment; and storing the predetermined processing request not allocated to the second execution environment, as a wait request, and when the session identifier identifying the session, to which the wait request belongs, is attached to a response from the first execution environment, allocating the wait request to the second execution environment.

2. The information processing method as claimed in claim 1, wherein the condition is specified based on a resource currently allocated to the first execution environment.

3. The information processing method as claimed in claim 1, wherein the condition indicates a predetermined threshold value, when at least one of the size of memory storage area, the number of file descriptors, and the number of exclusive locks for the resource which are currently allocated to the first execution environment exceeds the predetermined threshold value, it is judged that the predetermined efficiency cannot be assured.

4. The information processing method as claimed in claim 1, wherein the condition indicates a predetermined value, when the size of the memory storage area being used among memory storage areas allocated to the first execution environment exceeds the predetermined value, it is judged that the predetermined efficiency cannot be assured and further garbage collection is performed for the first execution environment.

5. A server computer communicably connected to a client computer, the server computer comprising:

a processing request reception unit for receiving the series of processing requests transmitted from the client computer;

a first execution environment and a second execution environment for executing a program performing information processing in accordance with the series of processing requests;

a condition storage unit for storing a condition for judging whether a predetermined processing efficiency is assured for the information processing performed by the first execution environment according to the series of processing requests;

a judgment unit for judging whether the predetermined processing efficiency is assured according to the condition; and a processing request allocation unit for temporarily suspending distribution of a predetermined processing request of the series of processing;

allocating the predetermined processing request to the first execution environment when it is judged that the predetermined efficiency is assured with the first execution environment according to the condition;

storing a session identifier identifying a series of sessions to which the processing request allocated to the first execution environment belongs therein;

when the server computer judges that the predetermined processing efficiency cannot be assured with the first execution environment according to the condition, storing data inherited between the series of processing requests, in a storage area accessible from the first execution environment and the second execution environment, and judging whether the session identifier identifying the session to which the processing request received from the client is stored; and when the session identifier is stored, a preventing the predetermined processing request from being allocated to the second execution environment; and storing the predetermined processing request not allocated to the second execution environment, as a wait request, and when the session identifier identifying the session, to which the wait request belongs, is attached to a response from the first execution environment, allocating the wait request to the second execution environment.

6. An information processing system comprising a client computer and a server computer communicably connected to a client computer, the server computer comprises:

a CPU and a memory;

a processing request reception unit for receiving the series of processing requests transmitted from the client computer;

a first execution environment and a second execution environment for executing a program performing information processing in accordance with the series of processing requests;

a condition storage unit for storing a condition for judging whether a predetermined processing efficiency is assured for the information processing performed by the first execution environment according to the series of processing requests;

a judgment unit for judging whether the predetermined processing efficiency is assured according to the condition; and a processing request allocation unit for temporarily suspending distribution of a predetermined processing request of the series of processing;

allocating the predetermined processing request to the first execution environment when it is judged that the predetermined efficiency is assured with the first execution environment;

storing a session identifier identifying a series of sessions to which the processing request allocated to the first execution environment belongs therein; and when the server computer judges that the predetermined processing efficiency cannot be assured with the first execution environment according to the condition, storing data inherited between the series of processing requests, in a storage area accessible from the first execution environment and the second execution environment, and judging whether the session identifier identifying the session to which the processing request received from the client is stored; and when the session identifier is stored, a preventing the predetermined processing request from being allocated to the second execution environment; and storing the predetermined processing request not allocated to the second execution environment, as a wait request, and when the session identifier identifying the session, to which the wait request belongs, is attached to a response from the first execution environment, allocating the wait request to the second execution environment.

7. A machine-readable storage medium, the machine-readable storage medium having stored thereon a series of instructions which when executed by a processing component cause a server computer, communicably connected to a client computer and having a first execution environment and a second execution environment for executing a program for performing information processing in accordance with a series of processing requests transmitted from the client computer, to execute:

a step for storing a condition for judging whether a predetermined processing efficiency is assured for the information processing performed by the first execution environment according to the processing requests;

a step for receiving the series of processing requests transmitted from the client computer;

a step for judging whether the predetermined processing efficiency is assured according to the condition;

a step for allocating a predetermined processing request to the first execution environment when it is judged that the predetermined efficiency is assured with the first execution environment according to the condition;

a step for storing a session identifier identifying a series of sessions to which the processing request allocated to the first execution environment belongs therein; and when the server computer judges that the predetermined processing efficiency cannot be assured with the first execution environment, a step for storing data inherited between the series of processing requests according to the condition, in a storage area accessible from the first execution environment and the second execution environment, and a step for judging whether the session identifier identifying the session to which the processing request received from the client is stored; and when the session identifier is stored, a preventing the predetermined processing request from being allocated to the second execution environment; and a step for storing the predetermined processing request not allocated to the second execution environment, as a wait request, and when the session identifier identifying the session to which the wait request belongs is attached to a response from the first execution environment, a step for allocating the wait request to the second execution environment.

\* \* \* \* \*